United States Patent
Jang et al.

(10) Patent No.: US 8,750,213 B2
(45) Date of Patent: Jun. 10, 2014

(54) PROVIDING A DENY RESPONSE THAT SPECIFIES A DELAY TIME

(75) Inventors: Ke-Chi Jang, Plano, TX (US); Lori Sinclair, Allen, TX (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 13/381,557

(22) PCT Filed: Aug. 12, 2010

(86) PCT No.: PCT/US2010/045338
§ 371 (c)(1),
(2), (4) Date: Dec. 29, 2011

(87) PCT Pub. No.: WO2011/019925
PCT Pub. Date: Feb. 17, 2011

(65) Prior Publication Data
US 2012/0106458 A1    May 3, 2012

Related U.S. Application Data

(60) Provisional application No. 61/233,205, filed on Aug. 12, 2009.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 7,225,383 B1 * | 5/2007 | Wood et al. | 370/252 |
| 7,505,397 B2 * | 3/2009 | Lee et al. | 370/208 |
| 2002/0177413 A1 | 11/2002 | Jouppi et al. | |
| 2002/0183055 A1 | 12/2002 | Hunzinger et al. | |
| 2005/0267980 A1 * | 12/2005 | Warren et al. | 709/232 |
| 2006/0168240 A1 * | 7/2006 | Olshefski | 709/227 |
| 2006/0168262 A1 * | 7/2006 | Frazer | 709/230 |
| 2006/0206558 A1 * | 9/2006 | Cohen et al. | 709/201 |
| 2007/0191010 A1 | 8/2007 | Kim et al. | |
| 2007/0248060 A1 | 10/2007 | Mooney et al. | |
| 2009/0003363 A1 * | 1/2009 | Benco et al. | 370/401 |
| 2009/0006920 A1 * | 1/2009 | Munson et al. | 714/748 |
| 2013/0136082 A1 * | 5/2013 | Kang et al. | 370/329 |

OTHER PUBLICATIONS

"3rd Generation Partnership Project; Technical Specification Group Radio Access Network; Evolved Universal Terrestrial Radio Access (E-UTRA) Radio Resource Control (RRC); Protocol Specification (Release 8)", 3GPP TS 36.331 v8.5.0 (Mar. 30, 2009) consisting of 204 pages.

International Search Report and Written Opinion dated Feb. 28, 2011 for International Application No. PCT/US2010/045338, International Filing Date: Aug. 12, 2010 consisting of 9-pages.

Office Action and translation thereof in corresponding Russian Patent Application No. 2012108944, Aug. 5, 2013, pp. 1-9.

* cited by examiner

*Primary Examiner* — Anh-Vu Ly

(74) *Attorney, Agent, or Firm* — Meyertons, Hood, Kivlin, Kowert & Goetzel, P.C.

(57) ABSTRACT

A system receives, from a mobile station, a connection request that specifies a particular application type. In response to determining that the connection request is to be denied, the system sends a response denying the connection request to the mobile station, where the response includes a delay time that is applicable to the particular application type but not to another application type, and where the delay time indicates an amount of delay that the mobile station is to wait before resending another connection request.

18 Claims, 3 Drawing Sheets

PROVIDING A DENY RESPONSE THAT SPECIFIES A DELAY TIME

CROSS-REFERENCE TO RELATED APPLICATIONS

This application is a Submission Under 35 U.S.C. §371 for U.S. National Stage Patent Application of International Application Number: PCT/US2010/045338, filed Aug. 12, 2010 entitled "PROVIDING A DENY RESPONSE THAT SPECIFIES A DELAY TIME," which claims priority to U.S. Provisional Application Ser. No: 61/233,205, filed Aug.12, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services. Another alternative 4G wireless technology is WiMAX (Worldwide Interoperability for Microwave Access), as defined by IEEE 802.16.

SUMMARY

In general, according to some embodiments, a system receives, from a mobile station, a connection request that specifies a particular application type. In response to determining that the connection request is to be denied, the system sends a response denying the connection request to the mobile station, where the response includes a delay time that is applicable to the particular application type but not to another application type, and where the delay time indicates an amount of delay that the mobile station is to wait before resending another connection request.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
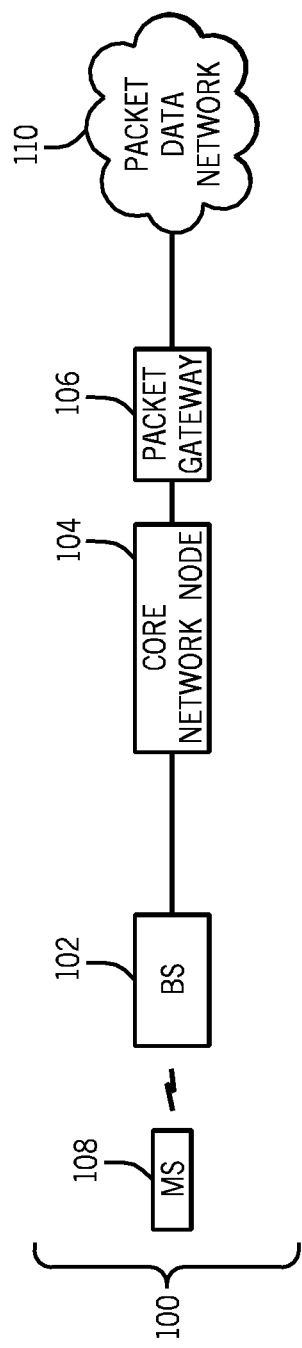
FIG. 1 illustrates an example arrangement of a mobile telecommunications network incorporating some embodiments.

Packet-switched communications are provided by various different types of mobile telecommunications wireless networks, such as third generation (3G) and fourth generation (4G) mobile telecommunications wireless networks. One type of 4G wireless network is the Long Term Evolution (LTE) wireless network, as defined by the Third Generation Partnership Project (3GPP). The LTE standard is also referred to as the EUTRA (Evolved Universal Terrestrial Radio Access) standard. Another alternative 4G wireless technology is WiMAX (Worldwide Interoperability for Microwave Access), as defined by IEEE 802.16).

An example of a 3G wireless network is a High Rate Packet Data (HRPD) wireless network, as defined by the CDMA (Code Division Multiple Access) 2000 standards, as established by 3GPP2. Another example of a 3G wireless network is based on Universal Mobile Telecommunication System (UMTS) standards, as defined by 3GPP. Yet another example of a 3G wireless network is based on EDGE (Enhanced Data Rates for GSM Evolution) technologies, as defined by 3GPP.

In further examples, other standards also provide for packet-switched communications (also referred to interchangeably as "packet communications").

A mobile station within a wireless network can engage in various different types of packet communications. Generally, packet communications can be of various different application types, where an "application type" refers generally to a type of communication or a type of traffic exchanged between the mobile station and another endpoint. As examples, different application types (for packet communications over a wireless network) can include a delay-sensitive type or a non-delay sensitive type. Communications according to the delay-sensitive type are relatively sensitive to delay in communication of packets. Examples of communications that are of the delay-sensitive type include voice communications (e.g., voice-over-Internet Protocol or VoIP communications), streaming communications (such as streaming of video and/or audio data), or electronic gaming communications (e.g., video games played over the web). Further examples of communications that are of the delay-sensitive type are emergency communications (e.g., E911 calls). Examples of communications that are of the non-delay sensitive type include web browsing communications, electronic mail communications, and so forth.

Different application types can be treated by the wireless network with different priorities. For example, VoIP communications or E911 communications are generally given higher priority than web browsing or e-mail communications. If the wireless network is relatively heavily loaded, the network may deny connection requests (from mobile stations) for certain, lower priority application types. Typically, the network does not control how frequently a mobile station is allowed to re-send a connection request (for a particular application type) after the network has denied a prior connection request (for the particular application type). Conventionally, if a connection request (for the particular application type) is denied, the mobile station can immediately or quickly send another connection request (for the particular application type).

In a wireless network with a large number of mobile stations each engaged in communications of multiple application types, a large volume of resending of connection requests after connection request denials can result in increased traffic over wireless channels, which can reduce the effective capacity of the wireless channels. The volume of connection requests can be multiplied by the fact that a mobile station, after repeated denials of connection requests, can continue to repeat submissions of further connection requests that are also denied. Not only does the increased volume of connection requests result in excessive loading of wireless channels, they also lead to excessive loading of the processing resources of network nodes that have to process connection requests that are repeatedly sent by mobile stations even though prior connection requests have been denied. In addition, repeated connection requests that are rejected could interfere with the efficient operation of the mobile station (e.g. slow the processor, drain the battery).

In accordance with some embodiments, a wireless network is able to specify a defined time delay (referred to as a "backoff delay") in a response to a connection request that denies the connection request from a mobile station. The backoff delay is applicable to the particular application type that is specified by the denied connection request. However, the backoff delay is not applicable to connection requests for other application types. For example, if a mobile station sends a first connection request that specifies a first application type, and this first connection request is denied, the mobile station will use the backoff delay specified in the response denying the first connection request to wait the backoff delay before sending another connection request for the first application type. However, the mobile station is free to send connection requests for other application types even though a backoff delay has been specified for the first application type. Thus, even though a backoff delay is specified for a lower priority application type, the mobile station can continue to send connection requests for higher priority application types. In this way, the sending of connection requests for certain application types can be reduced to reduce loading on the wireless link as well as to reduce loading on the processing resources of network nodes.

FIG. 1 illustrates an example arrangement that includes a mobile telecommunications network 100 that has a base station 102 in wireless communication with a mobile station 108. Although just one base station 102 is depicted in FIG. 1, note that there are typically multiple base stations in a mobile telecommunications network. Also, there are typical multiple mobile stations in communication with each base station.

In some implementations, the base station 102 can be an EUTRA base station (referred to as enhanced node B or eNode B) if EUTRA technology is used. In other implementations, if other wireless technologies (e.g., HRPD, UMTS, EDGE, etc.) are employed, then other types of base stations are employed. A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

The base station 102 is in turn connected to a core network node 104. With the EUTRA technology, the core network node 104 can be a serving gateway that is used for routing bearer data packets. The core network node 104 can in turn be connected to a packet gateway 106 that provides connectivity between the core network node 104 and a packet data network 110 (e.g., the Internet, a network that provides various services, etc.).

If the HRPD technology is used, then the functionalities of the core network node 104 and packet gateway 106 can be combined into a packet data serving node (PDSN). With other technologies, other combinations of network nodes can be used.

Reference to the EUTRA, HRPD, or other standards in this application is intended to refer to current standards, as well as standards that evolve over time. It is expected that future standards that evolve from current standards may be referred to by different names. Thus, reference to a particular standard in this present application is intended to cover such subsequently evolved standards as well, whether or not the same names are used. In addition to the wireless protocols noted above, techniques or mechanisms according to some implementations are applicable to systems employing other types of wireless protocols.

Figure 2:
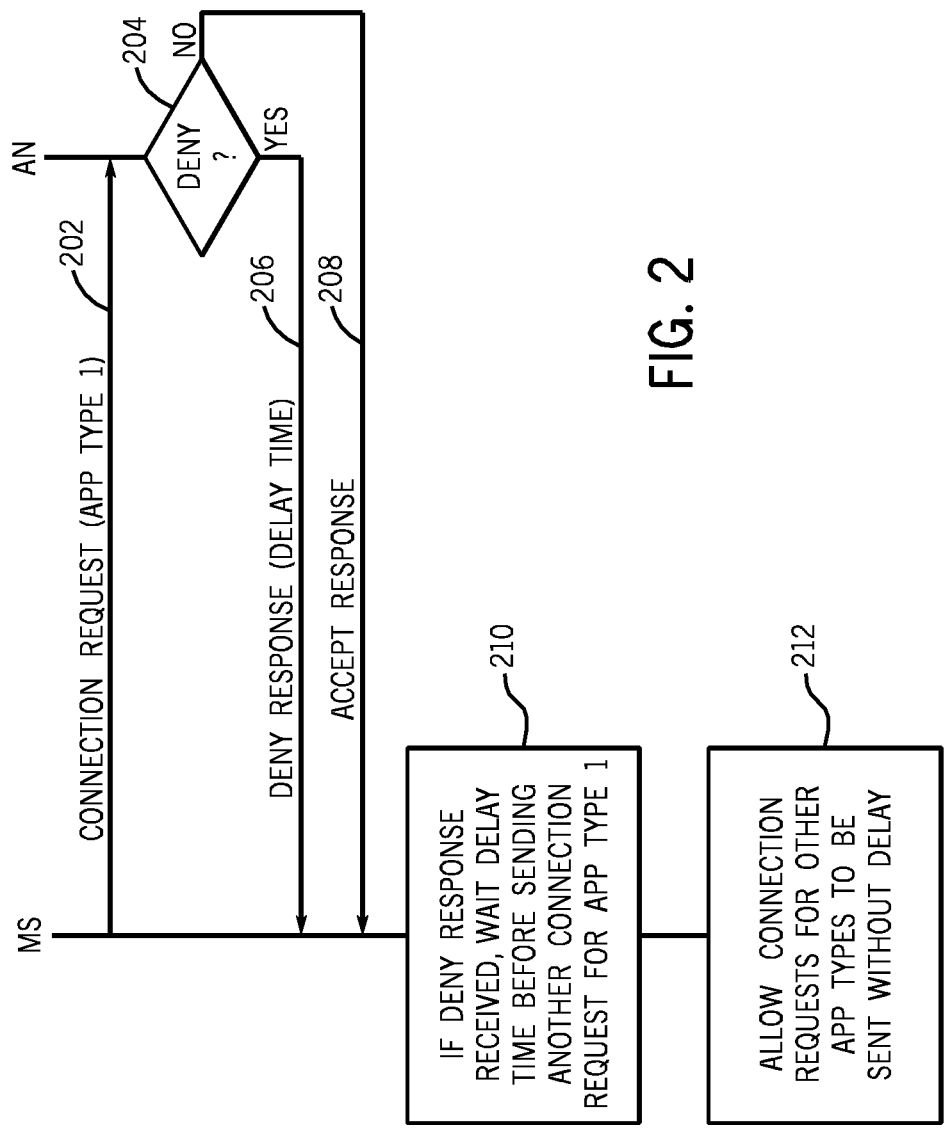
FIG. 2 is a message flow diagram of a process performed according to some embodiments.

FIG. 2 is a flow diagram of the process according to some embodiments. The mobile station sends (at 202) a connection request for application type 1 to an access network (AN). The term "access network" is intended to refer to equipment in the wireless network that allows the mobile station to perform wireless communications. Such equipment can include the base station or some other node in the network.

The connection request includes a field that is settable to different values for specifying corresponding application types. Thus, the field of the connection request set to a first value indicates a first application type, the field set to a second value indicates a second application type, and so forth. As noted above, application types can be in general categories such as "delay-sensitive type" and "non-delay-sensitive type." Alternatively, the application types can be more specific, such as "VoIP type," "E911 type," "streaming type," "e-gaming type," "web browsing type," "e-mail type," etc. In other implementations, the application type information can be in the form of priority information or quality-of-service (QoS) information. The priority or QoS information specifies a particular priority or QoS to be provided to the requested communication, which the access network can use to determine or indicate the application type.

In response to the connection request, the access network determines (at 204) whether the connection request for application type 1 should be denied. If so, a deny response is sent (at 206) to the mobile station, with the deny response containing a delay time (backoff delay) that specifies an amount of delay that the mobile station is to wait before resending another connection request for application type 1. In some examples, the access network can specify different backoff delays for different application types. A first application type is associated with a first backoff delay, a second application type is associated with a second, different backoff delay, and so forth. Generally, higher priority application types are associated with lower backoff delays than lower priority application types. The access network can store a data structure (e.g., a table or other data structure) that maps application types to corresponding backoff delays.

If the connection request for application type 1 is determined (at 204) to not be denied, then an accept response is sent (at 208) from the access network to the mobile station to grant the connection request and to allow the mobile station to perform communications for application type 1.

At the mobile station, if a deny response to the connection request for application type 1 is received, then the mobile station waits (at 210) the delay time specified in the deny response before sending another connection request for application type 1. The waiting at the mobile station can be accomplished by starting a timer in response to receiving a deny response with a backoff delay, where the timer expires after the backoff delay has transpired. Expiration of the timer allows the mobile station to send another connection request for application type 1.

Note that the mobile station allows (at 212) connection requests for other application types to be sent without delay (in other words, the delay time specified in the deny response for the connection request of application type 1 does not affect the timing of the sending of connection requests for other application types).

Using techniques according to some implementations, access channel loading and congestion can be reduced, and access channel capacity can potentially be increased.

Figure 3:
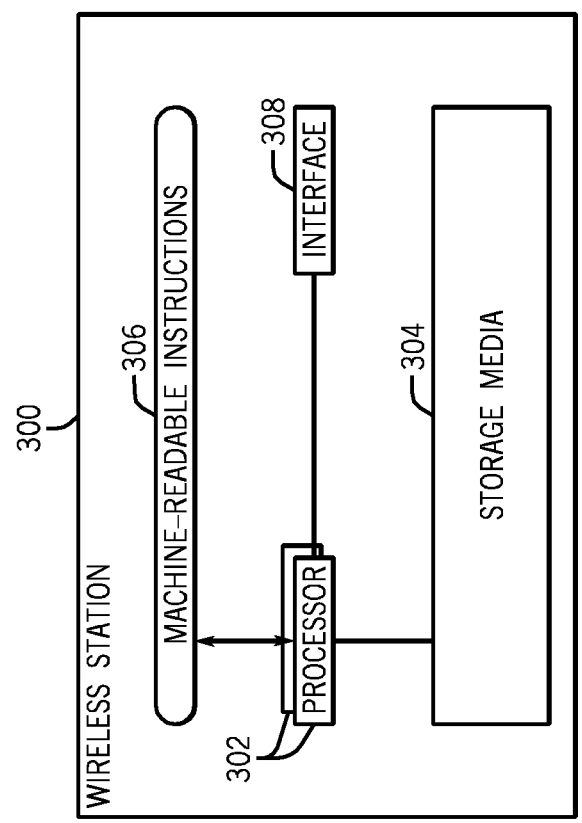
FIG. 3 is a block diagram of a wireless station according to some examples.

FIG. 3 is a block diagram of a wireless station 300, which can either be a mobile station (e.g., mobile station 108 in FIG. 1) or a base station (e.g., 102 in FIG. 1). The wireless station 300 includes a processor (or multiple processors) 302, which is (are) connected to storage media 304. Machine readable instructions 306 are executable on the processor(s) 302 to perform respective tasks associated with the wireless station 300, such as tasks depicted in FIG. 2. The wireless station 300 also includes an interface 308 for communicating over a wireless link, such as a radio frequency (RF) link.

The machine-readable instructions 306 are loaded for execution on the processor(s) 302. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system, a first connection request from a mobile station that specifies a first particular type of application;
determining, by the system, whether or not to deny the first connection request based on the first particular type of application specified by the first connection request;
in response to determining that the first connection request is to be denied, sending, by the system to the mobile station, a response denying the first connection request, wherein the response includes a delay time that is applicable to the first particular type of application but not to another type of application, and wherein the delay time indicates an amount of delay that the mobile station is to wait before resending another connection request for the first particular type of application; and
receiving, by the system, a second connection request from the mobile station that specifies a second particular type of application, wherein the second connection request is received during the delay.

2. The method of claim 1, wherein the first connection request has a field settable to one of plural different values to specify a corresponding one of plural different types of applications.

3. The method of claim 2, wherein the plural types of applications comprise plural packet communication types of applications.

4. The method of claim 2, wherein the plural types of applications include a type of delay-sensitive application and a type of non-delay sensitive application.

5. The method of claim 2, wherein plural types of applications include types of applications selected from among: a voice call application, an emergency application, a web browsing application, an electronic gaming application, a streaming application, and an electronic mail application.

6. The method of claim 2, wherein the plural types of applications include communications according to different priorities.

7. The method of claim 2, wherein the plural types of applications include communications according to different qualities of service.

8. The method of claim 1, wherein the system is part of an Evolved Universal Terrestrial Radio Access (EUTRA) network.

9. The method of claim 1, wherein the system is part of a third generation mobile telecommunications network.

10. A method comprising:
sending, by a mobile station to an access network, a first connection request that specifies a first particular type of application;
receiving, by the mobile station, a response indicating that the first connection request has been denied, wherein the response contains a delay time applicable to the first particular type of application but not to another type of application;
sending, by the mobile station, a second connection request that specifies a second type of application, wherein sending the second connection request is not dependent on the delay time in the response; and
waiting, by the mobile station, the delay time before sending another connection request for the first particular type of application.

11. The method of claim 10, wherein the first connection request has a field settable to one of plural different values to specify a corresponding one of plural different types of applications.

12. A network node comprising:
an interface to communicate in a network; and
at least one processor configured to:
receive, from a mobile station, a first connection request that specifies a first particular type of application;

determine whether or not to deny the first connection request based on the first particular type of application specified by the first connection request;

in response to determining that the first connection request is to be denied, send, to the mobile station, a response denying the first connection request, wherein the response includes a delay time that is applicable to the first particular type of application but not to another type of application, and wherein the delay time indicates an amount of delay that the mobile station is to wait before resending another connection request for the first particular type of application; and receive, from the mobile station, a second connection request that specifies a second particular type of application, wherein the second connection request is received during the delay.

13. The network node of claim 12, wherein the first connection request has a field settable to one of plural different values to specify a corresponding one of plural different types of applications.

14. The network node of claim 13, wherein the plural types of applications include a type of delay-sensitive application and a type of non-delay sensitive application.

15. The network node of claim 13, wherein plural types of applications include types of applications selected from among: a voice call application, an emergency application, a web browsing application, an electronic gaming application, a streaming application, and an electronic mail application.

16. The network node of claim 13, wherein the plural types of applications include communications according to different priorities or qualities of service.

17. A mobile station comprising:

an interface to perform wireless communications with an access network; and at least one processor configured to:
send a first connection request that specifies a first particular type of application;
receive a response indicating that the first connection request has been denied, wherein the response contains a delay time applicable to the first particular type of application but not to another type of application;
send a second connection request that specifies a second type of application, wherein sending the second connection request is not dependent on the delay time in the response; and
wait the delay time before sending another connection request for the first particular type of application.

18. The mobile station of claim 17, wherein the first connection request has a field settable to one of plural different values to specify a corresponding one of plural different types of applications.

* * * * *